Patented Dec. 7, 1926.

1,609,522

UNITED STATES PATENT OFFICE.

ERNST LEHR, OF DARMSTADT, GERMANY.

TESTING MATERIALS.

Application filed November 3, 1924, Serial No. 747,644, and in Germany November 7, 1923.

My invention refers to the testing of materials and more particularly to the testing of metallic parts of machinery. It is an object of my invention to provide means for the ascertaining of the so-called fatigue-limit of such materials in a particularly simple and efficient manner. The fatigue-limit is the strain under which a material can be placed for instance a hundred million times, each time beginning with zero, without breaking.

While the static testing of materials in order to ascertain for instance the proportionality, elasticity or breaking limit, can be effected comparatively easily and quickly, the testing with regard to the fatigue-limit, which governs the resistivity against dynamic stresses, is very difficult and takes up much time. Hitherto the tests had to be carried on with great care for many months, these tests consisting in continually subjecting one of a plurality of test bars of equal size and configuration to varying loads exceeding the fatigue-limit. The number of variations of load which was chosen excessive on purpose, was ascertained which caused the bar to break without showing any exterior signs before breaking. Obviously a sudden breaking could be assumed under these circumstances so that the test bar had still been loaded below the proportionality limit. In consequence thereof, a smaller load was chosen for the next succeeding test bar and in consequence thereof the number of variations of load increased steadily during the succeeding tests. At each test the number of variations of load which led to the certain breaking of the bar, was ascertained, each test being carried out with a somewhat lower load than the test preceeding it. At each individual test the number of variations of load up to the sudden breaking of the material at the respective load was ascertained, this load being chosen somewhat smaller for each succeeding test. From 10 to 20 tests of this kind, the last of which required up to 20 million variations of load, the fatigue-limit that is the strain which the test piece can in all probability be subjected to without breaking with the load varying an infinite number of times, was ascertained by taking down the values obtained and asymptotically extrapolating.

According to the present invention now the fatigue-limit of materials of any desired kind can be ascertained very quickly in a particularly simple and efficient manner by recording the power required for the production of the oscillations in dependency upon the amplitudes of oscillation (the path of variations of form). This power is gradually increased and in consequence thereof also the amplitude of the oscillation of the test pieces increases. The bend in the relation between power and amplitude of oscillation allows ascertaining the fatigue-limit. The influence of the device which produces the oscillations on the test piece, in other words the influence which produces the variation of loads acting on the test piece, is continually increased by hand or automatically until the bend in the relation between power and path of variation of form is exceeded.

Investigations have shown the fatigue-limit to coincide with the occurrence of the first permanent displacement of the particles (crystallites) of the test piece structure. This leads to the discovery that the power required for maintaining the oscillation load acting on the test piece will increase materially at the moment in which the variations of form of the structure which until then had been purely elastic, on reaching the fatigue-limit, are converted in a relative displacement of the particles which can only take place under friction. Preferably, instead of measuring the power, the power required per unit of time for keeping up the oscillation strain, is measured.

The new method can preferably be carried into effect by means of a device such as described in the application for patent for the U. S. Ser. No. 585,714, filed Sept. 1, 1922, by Heymann, this device allowing to increase easily and simply during the tests the influence of the oscillation producer. This device is provided with a mass having for instance the form of a disc, which carries an excentrically disposed body acting as an artificial load. In accordance with the size and the distance between this mass and the axis of rotation and in accordance with the number of rotations and the like the action of the mass produced by centrifugal forces can be varied.

In the device aforesaid the shaft of the disc-shaped body is mounted after the manner of a pendulum capable of oscillating about an axis disposed at right angles to the axis of the shaft, the pendulum motion being counter-acted by the elastic or spring action of the test piece. It is therefore possible for instance to gradually increase the influence of the disc-shaped mass during the test by shifting the mass radially outwards.

The relations between the power (or, if the number of revolutions of the machine is kept constant, only the direction of rotation) and the amplitude of oscillation, the load or variation of form of the test piece can be recorded automatically in the form of curves by means of the devices shown diagrammatically by way of example in the drawings affixed to this specification and forming part thereof.

In the drawings

Figure 1:
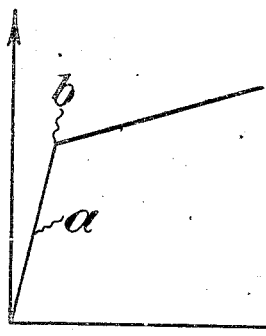
Fig. 1 shows a recording diagram on the abscissa of which the power or the turning moment and on the ordinate of which the amplitude of oscillation of the test piece is recorded.

Referring first to Fig. 1 of the drawings, the curve $a$ distinctly shows at $b$ the bend, that is the point at which with larger angles of oscillation, the power required for maintaining this angle increases at a materially greater rate than with smaller angles. The point $b$ directly indicates the fatigue-limit of the respective test piece.

It is immaterial for the method according to the present invention, what kind of strains or loads the test piece is subjected to and in what form the power producing the oscillations of the test piece is made to act on it.

Figure 2:
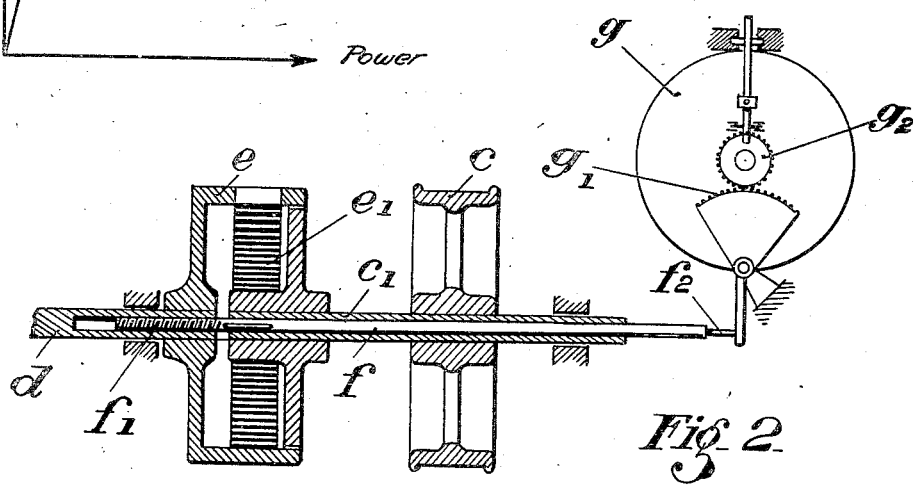
Figs. 2 and 3 are a diagrammatic longitudinal section and an elevation of a detail of that part of a fatigue machine with mechanical means for producing oscillations of the test piece, which are mainly intended for the measuring or recording of the curve.
Figure 3:
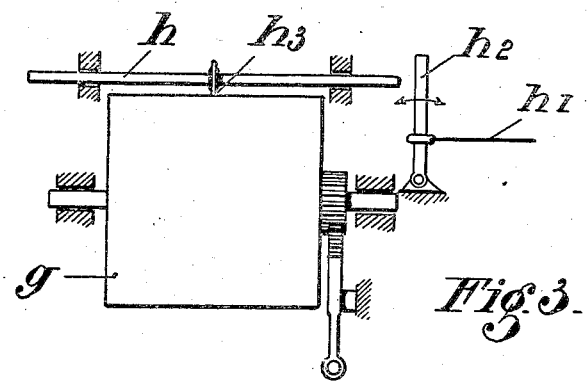

As an example of the way in which the invention is carried into effect, the automatic measuring of the fatigue-limit of a test piece subjected to bending stresses, shall be described with reference to Figs. 2 and 3.

$c$ is a pulley keyed onto a shaft $c^1$, $d$ is another shaft connected with and serving for operating a pneumatic or mechanical device for producing oscillations, such device being for instance described in the application for patent, Serial No. 585,714 mentioned above. Between the two shafts there is inserted a dynamometer $e$ (which may however be replaced by any other device for measuring and indicating power consumption). If the number of revolutions of the driving device can be kept constant, a simple torsion meter can be employed, which as shown in the drawing comprises a coil spring $e'$ having one of its ends fixed to the shaft $c^1$ while its other end is connected with the shaft $d$, the relative angular movement of the two ends of the spring affording means for ascertaining the value of the turning moment acting on the shaft. The test piece is set oscillating by the device (not shown) connected with and driven by a shaft $d$.

The power consumed during the test is recorded by means of the recording shaft $f$, mounted within the hollow shaft $c^1$ for axial displacement, shaft $f$ being however prevented from moving angularly with respect to shaft $c^1$. Shaft $f$ is displaced axially by means of a screw thread $f^1$ provided on one half of its end and gearing with the corresponding internal thread provided within the hollow of shaft $d$. The free end $f^2$ of the recording shaft acts on a sector $g^1$ meshing with a toothed wheel $g^2$ mounted on the shaft of the recording cylinder $g$.

The oscillations of the test bar are transmitted for instance by means of a connecting rod $h^1$ onto a rocking lever $h^2$ which is connected with a bar $h$ mounted for axial displacement near the circumference of the cylinder $g$. A pencil $h^3$ mounted on bar $h$ in contact with a paper placed on cylinder $g$ being displaced together with a bar $h$ by a rocking lever $h^2$ actuated by the test bar, will record thereon the ordinates spoken of with reference to Fig. 1.

Figure 4:
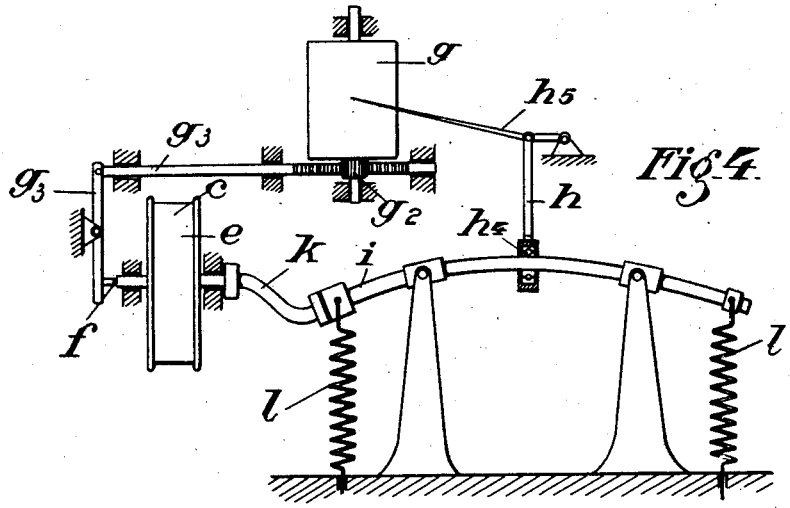
Fig. 4 is a diagram showing the arrangement of parts in a fatigue machine as indicated by Wöhler.

Fig. 4 is a purely diagrammatic representation of an arrangement for use in connection with a fatigue-machine as submitted by Wöhler. In this instance $i$ is the test bar and $k$ is a flexible shaft serving for rotating the bar, the springs $l$ which act on the ends of the bar causing this latter to be gradually bent. $e$ is the dynamometer serving for measuring the power consumed, and $c$ is the driving pulley. The recording shaft $f$ being adapted to be displaced longitudinally as described with reference to Fig. 2, acts on the mechanism $g^3$, comprising a rack which meshes with a pinion $g^2$ mounted on the shaft of the recording cylinder $g$. The test bar $i$ carries a rod $h$ mounted thereon with the aid of ball-bearings $h^4$ and acting on the pointer $h^5$ provided with a pencil (not shown) spaced in contact with the recording cylinder.

In the case where the oscillations of the test bar are brought about by magnetic or electro-magnetic means, I prefer measuring the power consumed by electric means.

Figure 5:
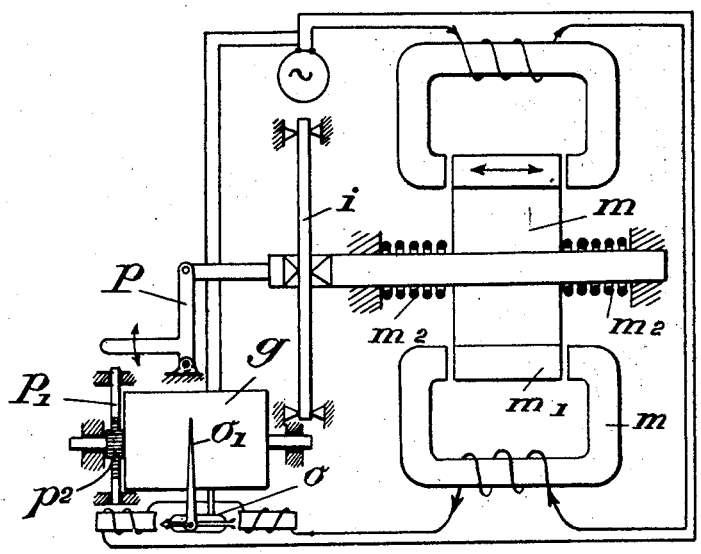
Fig. 5 is a diagrammatic showing of a similar arrangement for ascertaining the fatigue-limit of a test piece subjected to bending stress.

An arrangement of this kind is shown diagrammatically in Fig. 5. $i$ is the test bar which is set oscillating by the armature $m^1$ of an electro-magnet $m$, coil springs $m^2$ which are connected with the armature, serving for the production of elastic oscillations. The current and voltage of the electro-magnet $m$ pass through a watt meter $o$, provided with a hand $o^1$ recording its oscillations on the recording cylinder $q$ which is set rotating in dependency from the amplitude of oscillation of the test bar by means of the lever $p$ and a displaceable rack $p^1$ acting on the pinion $p^2$ mounted on the cylinder shaft.

The tests can be carried through in a very short time as the amplitudes of oscillation are increased by regulating the influence of the device which produces these oscillations, in the last mentioned case the armature $m$, on the test bar $i$ until the bend $b$ of the curve has been passed.

My novel method enables finished parts of machinery to be tested for their fatigue-limit without distraint.

Any number of periods of the oscillation strain placed on the test piece can be used, but I prefer carrying out the successive measuring at the rate of resonance of the oscillating arrangement comprising the test piece or being influenced mechanically as in this case the power supplied to the test piece forms the greatest possible part of the total power consumed whereby not only the economy of the device is rendered particularly favorable, but also the measuring and recording of the power will be carried out with the greatest exactness.

I wish it to be understood that I do not desire to be limited to the exact details of construction as shown and described, for any obvious modifications will occur to a person skilled in the art.

I claim:—

1. The method of ascertaining the fatigue-limit of solid bodies comprising setting the test bodies oscillating, means being used to cause such oscillations to simultaneously operate a recording device in one direction proportional to power employed and in another direction proportional to amplitude of oscillation, and recording the relation between the power required in producing the oscillations and the value of the amplitudes of oscillation, the recording curve representing the two quantities as co-ordinates, the bend of the recording curve showing the fatigue-limit.

2. The method of ascertaining the fatigue-limit of solid bodies comprising setting the test bodies oscillating, means being used to cause such oscillations to simultaneously operate a recording device in one direction proportional to power employed and in another direction proportional to amplitude of oscillation, and recording the relation between the power required in producing the oscillations and the value of the amplitudes of oscillation, the recording curve representing the two quantities as co-ordinates, the bend of the recording curve showing the fatigue-limit, and constantly increasing the amplitudes of oscillation until the bend is exceeded.

3. The method of ascertaining the fatigue-limit of solid bodies comprising setting the test bodies oscillating, means being used to cause such oscillations to simultaneously operate a recording device in one direction proportional to power employed and in another direction proportional to amplitude of oscillation, and recording the relation between the power required in producing the oscillations and the value of the amplitudes of oscillation, the recording curve representing the two quantities as co-ordinates, the bend of the recording curve showing the fatigue-limit, and constantly and automatically increasing the amplitudes of oscillation until the bend is exceeded.

4. The method of ascertaining the fatigue-limit of solid bodies comprising setting the test bodies oscillating, means being used to cause such oscillations to simultaneously operate a recording device in one direction proportional to power employed and in another direction proportional to amplitude of oscillation, and recording the relation between the power required in producing the oscillations and the value of the amplitudes of oscillation, the recording curve representing the two quantities as co-ordinates, the bend of the recording curve showing the fatigue-limit, and regulating the influence of the means which produce the oscillations onto the test bodies so as to constantly increase the amplitudes of oscillation until the bend is exceeded.

5. The method of ascertaining the fatigue-limit of solid bodies comprising setting the test bodies oscillating, means being used to cause such oscillations to simultaneously operate a recording device in one direction proportional to power employed and in another direction proportional to amplitude of oscillation, and recording the relation between the power required in producing the oscillations and the value of the amplitudes of oscillation, the recording curve representing the two quantities as co-ordinates, the bend of the recording curve showing the fatigue-limit, the records being taken at the rate of resonance of the entire arrangement.

6. A device for ascertaining the fatigue-limit of solid bodies comprising in combination, means for setting the test bodies oscillating, means for measuring the power consumed thereby in the unit of time and means for measuring the amplitudes of oscillation of the test bodies.

7. Device for ascertaining the fatigue-limit of solid bodies comprising in combination, means for setting the test bodies oscillating, means for measuring the power consumed thereby, means for measuring the amplitudes of oscillation of the test bodies, a recording device and means for transmitting to said recording device comprising a pencil and a recording strip the movements of said two measuring means in different directions.

In testimony whereof I affix my signature.

ERNST LEHR.